United States Patent
Wagner et al.

(10) Patent No.: US 11,346,415 B2
(45) Date of Patent: May 31, 2022

(54) BRAKE DISC FOR A VEHICLE

(71) Applicant: Bayerische Motoren Werke Aktiengesellschaft, Munich (DE)

(72) Inventors: Oliver Wagner, Munich (DE); Thomas Graf, Munich (DE); Kordian Kokott, Erding (DE); Ulf Schulz, Berlin (DE); Matthias Stangl, Dachau (DE); Thomas Bambl, Landshut (DE); Richard Wagner, Munich (DE); Stefan Bergmaier, Bad Birnbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/042,361

(22) Filed: Feb. 12, 2016

(65) Prior Publication Data

US 2016/0160948 A1 Jun. 9, 2016

Related U.S. Application Data

(63) Continuation of application No. PCT/EP2014/064989, filed on Jul. 11, 2014.

(30) Foreign Application Priority Data

Aug. 13, 2013 (DE) ...................... 10 2013 215 997.8

(51) Int. Cl.
*F16D 65/12* (2006.01)
*F16D 65/02* (2006.01)

(52) U.S. Cl.
CPC ......... *F16D 65/123* (2013.01); *F16D 65/125* (2013.01); *F16D 65/127* (2013.01); *F16D 2065/1392* (2013.01)

(58) Field of Classification Search
CPC ................... F16D 65/12; F16D 65/123; F16D 2065/1392; F16D 2065/1356;
(Continued)

(56) References Cited

U.S. PATENT DOCUMENTS 2,375,566 A * 5/1945 Lipps ................... F16D 65/123
188/218 XL
2,384,297 A * 9/1945 Goepfrich ............... F16D 55/32
188/196 P (Continued)

FOREIGN PATENT DOCUMENTS

CN 202071957 U 12/2011
CN 102414469 A 4/2012
(Continued)

OTHER PUBLICATIONS

International Search Report (PCT/ISA/210) issued in PCT Application No. PCT/EP2014/064989 dated Oct. 23, 2014 with English translation (seven pages).

(Continued)

*Primary Examiner* — Robert A. Siconolfi
*Assistant Examiner* — Mahbubur Rashid
(74) *Attorney, Agent, or Firm* — Crowell & Moring LLP

(57) ABSTRACT

A brake disc is provided for a disc brake, which consists of a brake disc chamber and at least one friction ring connected to the latter via connecting devices. A jacket of the brake disc chamber is provided with sections of reduced wall thickness and/or apertures. These sections and/or apertures are axially directed material recesses which are located on the outer circumference of the brake disc chamber jacket and serve for placing the connecting devices as close as possible to the brake disc chamber jacket.

13 Claims, 4 Drawing Sheets

(58) Field of Classification Search
CPC ....... F16D 2200/0013; F16D 2065/136; F16D 2065/13; F16D 2065/134; F16D 2065/1368; F16D 2069/0433
USPC .................................................. 188/218 XL
See application file for complete search history.

(56) References Cited

U.S. PATENT DOCUMENTS

| | | | | |
|---|---|---|---|---|
| 3,478,849 | A * | 11/1969 | Gunther | F16D 65/0006 188/218 A |
| 3,724,614 | A * | 4/1973 | Bender | F16B 5/04 188/218 XL |
| 4,790,413 | A * | 12/1988 | Meynier | F16D 3/06 188/18 A |
| 4,848,521 | A * | 7/1989 | Izumine | F16D 65/123 188/18 A |
| 5,921,633 | A * | 7/1999 | Neibling | B60B 27/0005 301/6.1 |
| 6,076,896 | A * | 6/2000 | Bertetti | B60B 27/00 188/18 A |
| 6,161,661 | A * | 12/2000 | Pahle | F16D 65/123 188/218 XL |
| 6,302,246 | B1 | 10/2001 | Naumann et al. | |
| 6,374,656 | B1 * | 4/2002 | Donini | B21B 13/023 72/11.7 |
| 6,467,588 | B1 * | 10/2002 | Baumgartner | F16D 65/123 188/218 XL |
| 6,564,913 | B2 * | 5/2003 | Baumgartner | F16D 65/123 188/18 A |
| 6,604,613 | B2 * | 8/2003 | Burgoon | F16D 65/0006 188/218 XL |
| 6,722,479 | B2 * | 4/2004 | Baumgartner | F16D 65/123 188/18 A |
| 6,880,682 | B2 * | 4/2005 | Gotti | B60B 27/001 188/218 R |
| 7,111,911 | B2 * | 9/2006 | Baumgartner | F16D 65/123 188/218 XL |
| 7,261,192 | B2 * | 8/2007 | Khambekar | F16D 65/127 188/218 XL |
| 7,654,365 | B2 * | 2/2010 | Lamb | F16D 65/12 188/18 A |
| 7,780,243 | B2 * | 8/2010 | Lippis | F16D 65/12 188/18 A |
| 7,866,447 | B2 * | 1/2011 | Baumgartner | F16D 65/12 188/18 A |
| 7,918,322 | B2 * | 4/2011 | Pahle | F16D 65/123 188/18 A |
| 8,287,052 | B2 * | 10/2012 | Fakhoury | B60B 27/0057 301/105.1 |
| 8,308,369 | B2 * | 11/2012 | Guillaume | F16C 19/184 384/448 |
| 8,651,247 | B2 * | 2/2014 | Burgoon | F16D 65/123 188/18 A |
| 9,249,848 | B2 * | 2/2016 | Kokott | F16D 65/123 |
| 9,315,070 | B2 * | 4/2016 | Anno | B60B 27/0047 |
| 2002/0157908 | A1 * | 10/2002 | Burgoon | F16D 65/12 188/218 XL |
| 2003/0006104 | A1 * | 1/2003 | Baumgartner | F16D 65/123 188/17 |
| 2004/0031651 | A1 * | 2/2004 | Lehmann | F16D 65/12 188/218 XL |
| 2004/0134720 | A1 * | 7/2004 | Niebling | F16D 65/12 188/18 A |
| 2004/0182660 | A1 * | 9/2004 | Cavagna | F16D 65/123 188/218 XL |
| 2006/0113153 | A1 * | 6/2006 | Simmonds | F16D 65/12 188/218 XL |
| 2007/0193837 | A1 | 8/2007 | Lamb | |
| 2008/0271965 | A1 | 11/2008 | Reulein et al. | |
| 2009/0218183 | A1 * | 9/2009 | Burgoon | B60T 8/329 188/218 XL |
| 2010/0133054 | A1 * | 6/2010 | Wagner | F16D 65/12 188/218 XL |
| 2011/0127826 | A1 * | 6/2011 | Krabill | B60B 27/00 301/6.8 |
| 2012/0097491 | A1 | 4/2012 | Yamanaka et al. | |
| 2012/0247883 | A1 * | 10/2012 | Root | B60B 27/0052 188/18 A |
| 2012/0247884 | A1 | 10/2012 | Root et al. | |
| 2013/0327602 | A1 * | 12/2013 | Barber | B22C 9/02 188/218 XL |
| 2014/0339027 | A1 * | 11/2014 | Wurth | F16D 65/123 188/218 XL |
| 2016/0319889 | A1 * | 11/2016 | Ijames, Jr. | F16D 13/644 |

FOREIGN PATENT DOCUMENTS

| | | |
|---|---|---|
| DE | 1 775 685 A1 | 9/1971 |
| DE | 44 46 017 A1 | 7/1996 |
| DE | 198 15 807 A1 | 10/1998 |
| DE | 100 32 972 A1 | 1/2002 |
| DE | 101 25 116 A1 | 11/2002 |
| DE | 20 2005 013 569 U1 | 12/2005 |
| DE | 10 2007 011 743 A1 | 9/2008 |
| DE | 10 2008 051 598 A1 | 4/2010 |
| EP | 872658 A1 * | 4/1997 |
| EP | 0 872 659 A1 | 10/1998 |
| EP | 1 013 956 A2 | 6/2000 |
| EP | 1 260 728 A1 | 11/2002 |
| GB | 1190826 A | 5/1970 |
| JP | 2005-180482 A | 7/2005 |
| JP | 2006-37993 A | 2/2006 |
| WO | WO 03/062661 A1 | 7/2003 |

OTHER PUBLICATIONS

German-language Written Opinion (PCT/ISA/237) issued in PCT Application No. PCT/EP2014/064989 dated Oct. 23, 2014 (five pages).

German Search Report issued in counterpart German Application No. 10 2013 215 997.8 dated Feb. 27, 2014 with partial English translation (10 pages).

Chinese-language Office Action issued in counterpart Chinese Application No. 201480041411.3 dated Feb. 28, 2017 with English translation (22 pages).

German-language Office Action issued in European Application No. 14738528.0 dated Jun. 22, 2020 (four (4) pages).

German-language Office Action issued in German Application No. 10 2013 215 997.8 dated Aug. 9, 2021 with English translation (12 pages).

Chinese-language Office Action issued in Chinese Application No. 202011477468.1 dated Feb. 15, 2022 with English translation (14 pages).

* cited by examiner

BRAKE DISC FOR A VEHICLE

CROSS REFERENCE TO RELATED APPLICATIONS

This application is a continuation of PCT International Application No. PCT/EP2014/064989, filed Jul. 11, 2014, which claims priority under 35 U.S.C. § 119 from German Patent Application No. 10 2013 215 997.8, filed Aug. 13, 2013, the entire disclosures of which are herein expressly incorporated by reference.

BACKGROUND AND SUMMARY OF THE INVENTION

The invention relates to a brake disc for a motor vehicle consisting of a brake disc chamber and at least one friction ring connected with the latter by way of connection devices. Brake discs are components of a brake system for motor vehicles. Brake discs are coaxially mounted with a wheel and have a friction ring and brake disc chamber. The brake disc chamber is used for the fastening of the brake disc to a wheel hub, while the friction ring is placed in a tribological contact with the brake pads of the brake system during the braking operation. As a result, the kinetic energy of the motor vehicle is reduced in the form of frictional heat, and the vehicle is braked.

Such brake discs may be produced in one or more pieces, the highest stress being directed to the material of the friction ring. As a rule, friction rings are therefore constructed as cast components, particularly of GG-15 or GG-25. For the removal of the heat generated during the braking operation from the friction ring, such friction rings are frequently designed in the form of internally ventilated friction rings, i.e. they are equipped with ducts or boreholes, through which air will flow, in order to thereby improve the removal of heat from the friction ring. Such a brake disc, where the friction ring or (usually cohesive) friction rings are produced separately from the brake disc chamber and subsequently are appropriately connected with the latter, has the advantage that the friction ring(s), on the one hand, and the brake disc chamber, on the other hand, can be produced from materials that are most advantageous in view of the respective requirements. A saving of weight, for example, can therefore be achieved on the one hand, and, on the other hand, an advantageous decoupling thereby becomes possible between the friction ring and the brake disc chamber.

German Patent document DE 100 32 972 A1 describes such a composite brake disc, where the essentially conventionally shaped brake disc chamber has a jacket that is circularly cylindrical with respect to the axis of rotation of the brake disc. In the jacket, openings or at least sections of a reduced wall thickness are provided. As a result, this brake disc chamber has a certain elasticity, which is required for an essentially unhindered thermal friction ring expansion; i.e. the unavoidable thermal friction ring expansion is therefore not significantly hindered by the brake disc chamber, so that no tensions are built up and undesired friction ring deformations are prevented. In this document, a higher-strength steel material or the like is suggested as the material for the brake disc chamber. This known construction requires a relatively large amount of installation space in the radial direction, which allows a use only in the case of larger brake disc dimensions (diameters).

It is an object of the present invention to avoid this disadvantage; in particular, to provide a brake disc for smaller motor vehicles, for which, as a result of a suitable connection between the friction ring and the brake disc chamber, the space requirement for connecting the brake disc to the wheel hub can be minimized.

According to the invention, this object is achieved by a brake disc for a disc brake having a brake disc chamber and at least one friction ring connected with the latter by way of connection devices. The jacket of the brake disc chamber has sections of a reduced wall thickness and/or openings, wherein these sections or these openings are axially oriented material recesses situated at the outer circumference of the brake disc chamber jacket, which are used for the placing or at least partial placing of the connection devices.

According to the invention, the connection devices can therefore be pulled as closely as possible to the jacket of the brake disc chamber and, in the process, may at least partially project into the axially oriented recesses. In this case, the connection devices, for which, for example, rivets are used, preferably (also) extend in the axial direction, i.e. parallel to the axis of rotation of the brake disc. This has the advantage that the brake disc chamber, which is, for example, made of a light metal, can be riveted or screwed in the axial direction to a friction ring constructed, for example, in gray cast iron, as a result of the recesses (or notches) at the jacket of the brake disc chamber, such that the space required for the connection elements in the radial direction is clearly reduced. A connection area between the brake disc chamber and the friction ring with a smaller or minimized dimension in the axial direction can thereby be presented, so that the diameter of the brake disc chamber can be minimized and, as a result, a smaller brake disc can be provided.

With respect to their shaping, the axially oriented recesses are preferably adapted to the connection elements, in which case, each recess does not have to completely accommodate the pertaining connection device; rather, it is sufficient for the respective connection element to only partially project into the pertaining recess. Specifically, the recesses should also not be designed to be too large, so that the brake disc chamber or its jacket will not be excessively weakened. Accordingly, the recess may, for example, be designed for an essentially circular-cylindrical rivet as the connection device, for example, in the shape of a "semicircular cylinder", whose cylinder axis is situated in the area of the exterior side of the brake disc chamber, which is cylindrical without taking into account these recesses and, like the longitudinal axis of the rivet, extends parallel to the axis of rotation of the brake disc. For reasons of completeness, it should be mentioned that the term "placing", for which the recesses of the connection elements are used, refers not only to the final state of the mounted connection elements but also the mounting operation of the connection elements; i.e. the above-mentioned recesses are used or at least can be used for being able to mount the connection elements.

Preferred embodiments of the invention provide that the brake disc chamber consists of light metal, steel, a nonmetal material; i.e. preferably higher-strength, high-strength light metals (magnesium, among others), or of a high-strength thin-walled steel plate or aluminum and other nonferrous or nonmetal materials that can be used as materials for the chamber. The brake disc chamber can therefore be produced, for example, by a casting operation, a forging operation or by extruding. If a brake disc chamber according to the invention is used that is constructed of a light-weight material, it is conceivable to use steel wheels, in addition to aluminum wheels. It is advantageous for a radial steel ring to be provided in the contact area between the brake disc chamber and the wheel resting against the latter or for the chamber to be produced of a correspondingly resistant light material. The above-mentioned steel ring can be inserted or cast into an indentation of the brake disc chamber, in order to avoid an otherwise possibly occurring working of a steel wheel into the material of the brake disc chamber during the driving operation of the vehicle.

The friction ring and the brake disc chamber can advantageously be mutually centered by way of the connection devices and/or by way of suitably provided centering shoulders. In this case, the friction ring may have at least one fastening projection directed from the friction surface toward the interior (radially inward), with which fastening projection an edge or a collar of the brake disc chamber jacket can be connected by axially oriented connection devices. The joining point between the friction ring and the brake disc chamber may advantageously be designed as a press fit or shrunk-on fit or as a material-bonded or form-fitting connection. The connection between the brake disc chamber and the friction ring is preferably established by way of riveted connections; i.e. rivets are used as connection devices. In order to minimize the surface pressure of the rivets as much as possible also on the gray cast iron material of the friction ring, the manufacturing can, for example, take place by means of the wobble riveting process. In order to generate the largest possible freedom from play and thereby a quasi absolute form-closure between the brake disc chamber and the friction ring or the friction disc, knurled, buckled and/or stepped rivets (with a press fit) can be used.

In order to avoid a breaking-out of the riveted connection from the gray cast iron of the friction ring, a ring-shaped steel band may be provided, which is mounted between the rivet closing heads and the linking surface of the friction ring. This measure advantageously results in a two-dimensional force distribution or introduction of force by way of the steel band into the friction ring. If elevations are worked into the surface of the friction ring between the individual rivet closing heads, so that the steel band constructed, for example, as a spring steel ring, is deformed in a wavy manner because of these elevations or level differences, a certain pretensioning can thereby be generated, similar to a screwed connection. As an alternative, the steel band or the spring steel ring itself may have a correspondingly wavy design. Such a pretensioning increases the stability of the rivet connection, in which case a corresponding measure may also be provided by way of other connection devices, and contributes to the distribution of the tensions arising during operation. As an alternative, a screwed connection (for the connection device) is also contemplated. In order to prevent break-outs or cracks in the gray cast iron of the friction ring as a result of the forces during the riveting or generally during the bracing of the connection devices, suitable washers (of steel or spring steel, for example, in the form of a cup spring) between the rivet closing head (or the like) and the friction ring may be provided, in order to absorb the tensions arising during the riveting or bracing. This would naturally also be possible at the collar of the brake disc chamber.

In addition, the brake disc chamber may have a centering ("centering shoulder") in the form of a protruding collar, which simplifies the (pre)joining. Furthermore and for improving the contact surface and supporting surface and for reducing (gap) corrosion, the brake disc chamber can be (pre-)connected with the friction ring in this centering area by way of friction welding. The chamber is thereby fixed with the brake disc, and the (pre-)joining for the manufacturing process is significantly simplified, during which the connection elements are fixed between the friction ring and the brake disc chamber, as well as for a preceding, particularly cutting operational step, in which the above-mentioned material recesses for the at least partial placing of the connection devices are produced, for example, by drilling.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 3:
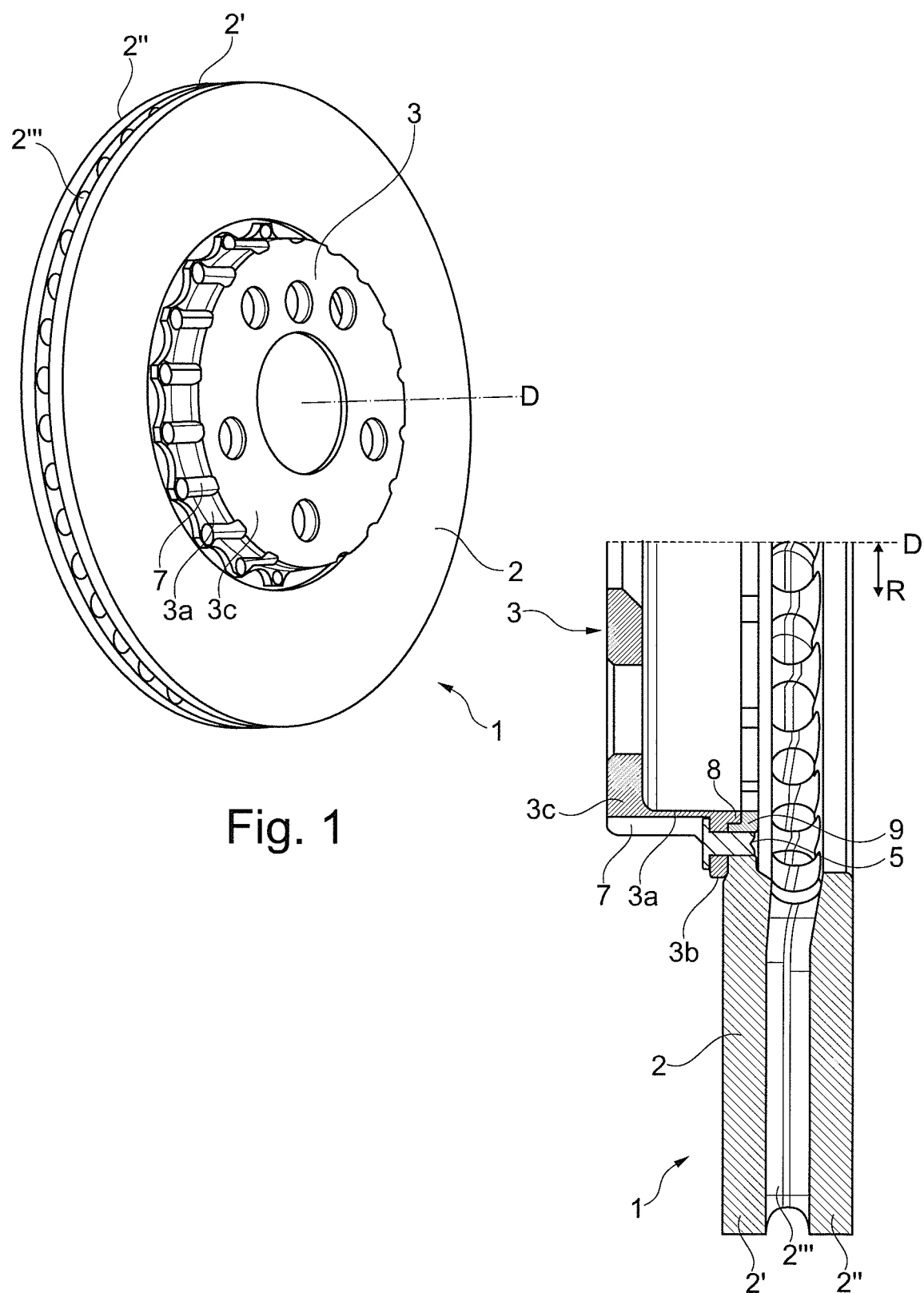
FIG. 1 is a view of a brake disc according to an embodiment of the invention in a spatial representation with a view of the brake disc chamber.
FIG. 3 is an enlarged partial sectional view according to FIG. 2 of a brake disc without the steel band from FIG. 2.

The brake disc 1 illustrated in the figures consists of a brake disc chamber 3 and a friction ring 2 and is (as usual) provided to be mounted on a wheel hub, which is not shown, in order to rotate with the latter about the axis of rotation D during operation. The one-piece, internally-cooled friction ring 2 produced of gray cast iron consists of two friction discs 2', 2" with cooling air conduction devices 2''' situated in-between and mutually connecting the latter. The ring-shaped friction disc 2' which, viewed in the axial direction, i.e. in the direction of the axis of rotation D, is situated closer to the brake disc chamber 3, extends, viewed in the radial direction R (with respect to the axis of rotation D) with a so-called fastening shoulder 9, by a certain (slight) degree farther toward the axis of rotation D than the other friction disc 2". The other friction disc 2" is more remote from the brake disc chamber 3 in the axial direction.

In the overlapping area between the above-mentioned fastening projection 9 of the friction disc 2' and a collar 3b projecting in the radial direction R from the free end of the jacket 3a of the brake disc chamber 3, which is circular-cylindrical with respect to the axis of rotation D, the brake disc chamber 3 is connected by way of connection elements 5 extending in the axial direction in the form of rivets (reference number 5 is also used for the latter) with the friction disc 2' and thereby with the friction ring 2. In this sense (and particularly, as discussed in the introduction to the specification), a connection between the brake disc chamber 3 and the friction ring 2 is provided.

Recesses 7 are located in the jacket 3a of the brake disc chamber 3 as well as, to a limited extent, also in the floor 3c of the brake disc chamber 3. The recesses 7 are uniformly distributed over the circumference of the brake disc chamber 3. Into these recesses 7, rivets 5 or connecting devices project, i.e. the rivets 5 are placed at least proportionally. Each of these recesses 7, which may also be called sections 7 of a reduced wall thickness, and may also be designed in the form of an opening, extends in the axial direction in order to at least partially not only accommodate the respective pertaining likewise oriented rivet 5 but also place, i.e. be able to mount the rivet, as illustrated, in the axial direction. In this case, these recesses 7 have the shape of a semicircular cylinder and are made, for example, by a cutting machining in the jacket 3a of the brake disc chamber 3 such that, although this jacket 3a is weakened in the area of these recesses 7, it still forms a closed wall on the inside, i.e. viewed from the direction of the axis of rotation D. However, as an alternative, the recesses 7 may also be placed closer toward the axis of rotation D, so that the jacket 3a, viewed in the radial direction R by way of these recesses, actually has openings. Naturally, openings in the form of boreholes are also provided in the collar 3b of the jacket 3a, quasi as a continuation of the recesses 7, through which connections elements 5 are fitted. It is essential that the recesses 7 are provided at the outer circumference of the brake disc chamber jacket 3a, so that, although the rivets 5 (or connection devices 5), on the one hand, are visible viewed from the outside in the radial direction R, they may, on the other hand, according to the invention, because of these recesses 7, be arranged (placed) closer toward the axis of rotation D, than if these recesses 7 were not present. As initially mentioned, this permits the construction of a brake disc 3 with a relatively small diameter in that the above-mentioned recesses 7 not only partially accommodate the connection elements/rivets 5, but also makes it possible to mount them.

It was mentioned above that the recesses 7 are designed at least approximately or essentially in the shape of a semicircular cylinder, the center plane of a solid cylinder containing the longitudinal axis of the solid cylinder, from which the respective semicircular cylinder is formed, is practically a tangential plane with respect to the surface of the jacket 3a of the brake disc chamber 3. As indicated particularly from FIG. 2, viewed in the radial direction R from the outside toward the axis of rotation D, the jacket 3a may have a concave shape between two adjacent recesses 7, so that, viewed in an integrated manner over the circumference, while taking the above-mentioned recesses 7 into account, the jacket 3 has an approximately uniform wall thickness.

The otherwise essentially cylindrical brake disc chamber jacket 3a is connected by way of rivets 5 as connecting devices (5) with the friction ring 3 by way of its above-mentioned collar 3b projecting away from its end facing away from the floor 3c of the chamber 3, while using a wobble riveting process. As mentioned above, as a result of the recesses 7 in the jacket 3a, these rivets 5 are placed as closely as possible to the brake disc chamber jacket 3a, more precisely, even at least partially in the brake disc chamber jacket 3a. A centering shoulder 8 at the collar 3b of the brake disc chamber 3 centers the brake disc chamber 3 with respect to the friction ring 2 or the friction disc 2' (or vice-versa), and more precisely with respect to their fastening projection. However, the two separately manufactured components—the brake disc chamber 3 and the friction ring 2—may also be mutually centered by the rivets 5 themselves or by way of a joint between the friction ring 2 and the brake disc chamber 3, which is designed as a press fit or shrunk-on fit or as a material-bonding connection.

Figure 2:
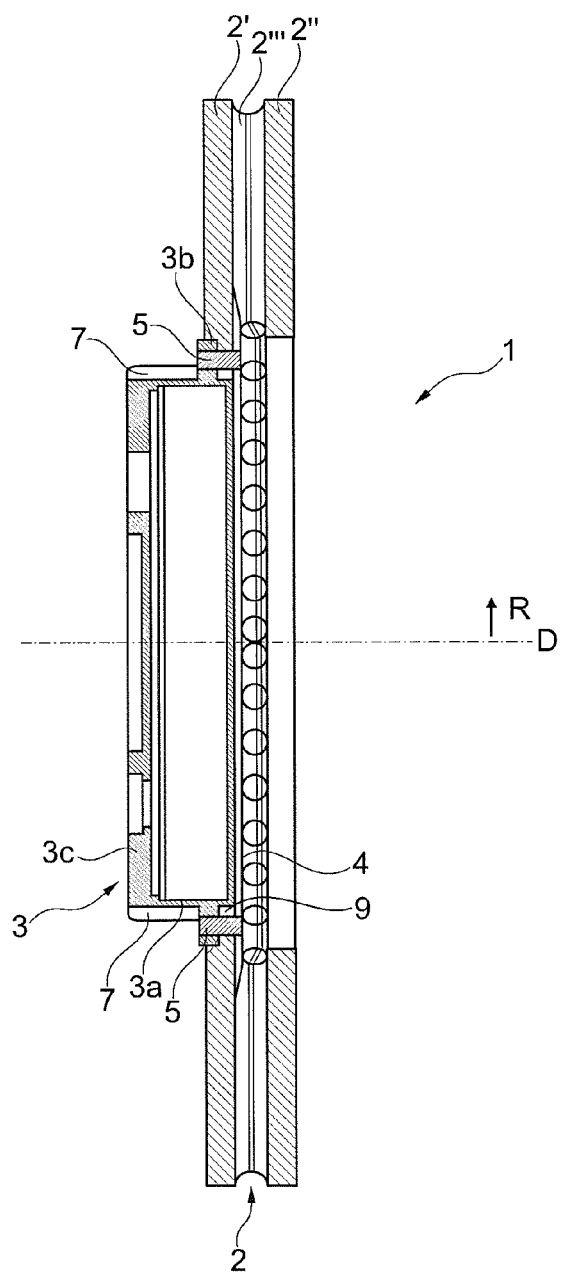
FIG. 2 is a sectional view of the brake disc according to FIG. 1 (the sectional plane contains the axis of rotation), rotated with respect to FIG. 1 about a vertical axis situated in the plane of the drawing, having a steel band situated below the rivet closing heads.
Figure 4:
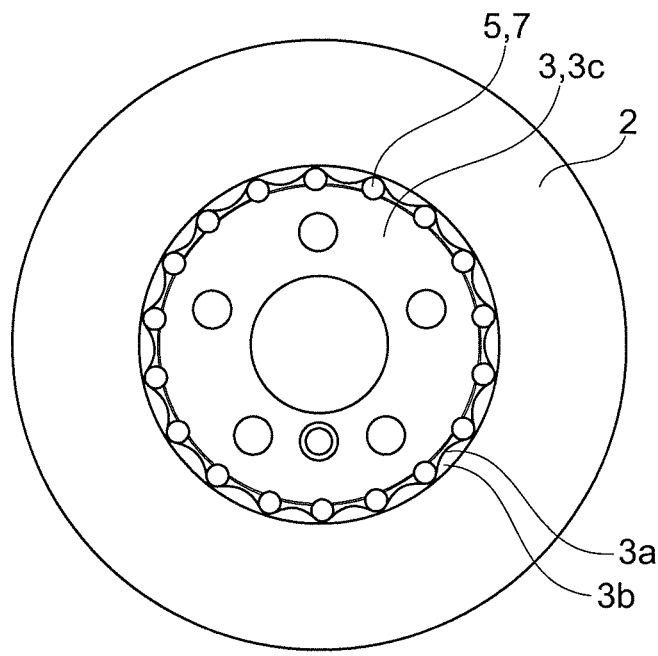
FIG. 4 is a top view of the chamber side of the brake disc.
Figure 5:
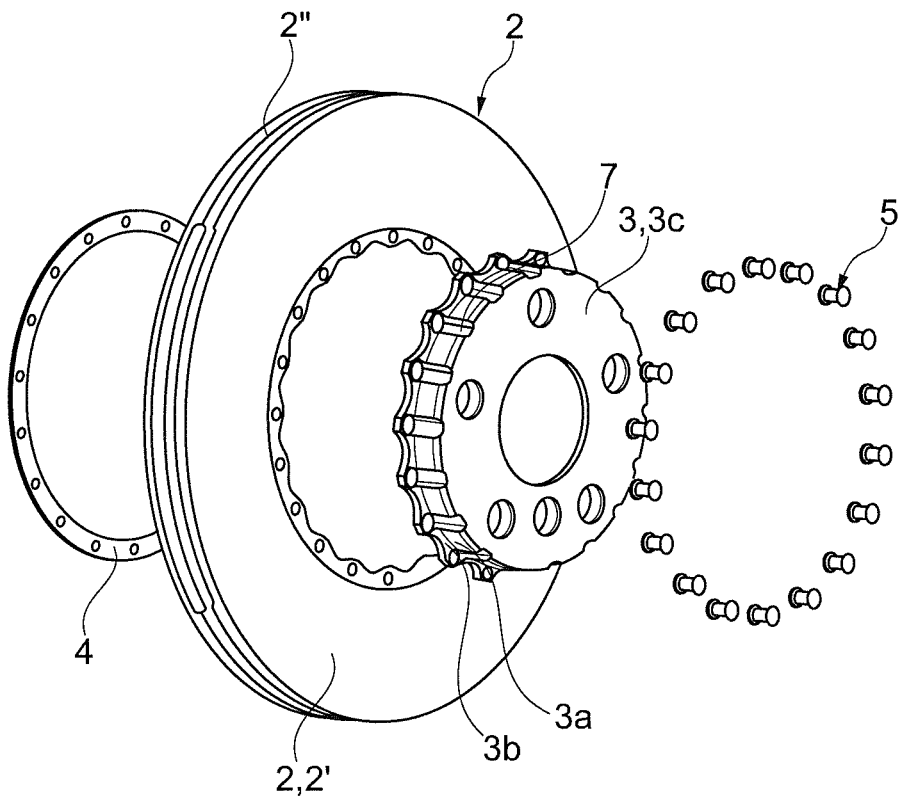
FIG. 5 is an exploded view of the brake disc with the steel band (according to FIG. 2).

In FIG. 2 as well as in FIG. 5, a ring-shaped steel band 4 is visible which rests on the interior side of the friction disc 2' below the closing heads of all rivets 5. This steel band 4 and a corresponding spring steel ring respectively were explained in greater detail before the figures were described.

Figure 6:
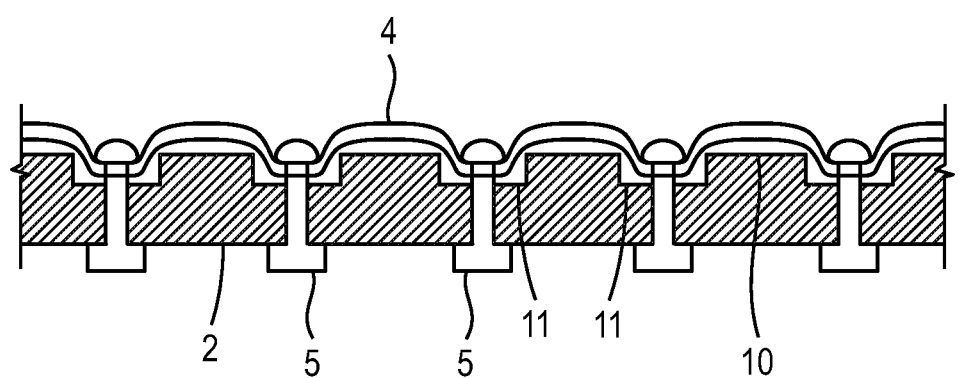
FIG. 6 is a partial elevation view of the region of the inner circumference of the brake disc of FIG. 5 in an assembled state.

FIG. 6. schematically illustrates such an arrangement, with a wavy ring-shaped steel band 4 providing pretensioning between the rivets 5 at friction ring lower elevations 11 and adjacent higher elevations 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disc for a disc brake, comprising:
   a brake disc chamber having a jacket with an axially-aligned wall portion and a collar portion extending radially outward from the wall portion;
   a brake disc friction portion having at least one brake chamber-side friction ring and at least one friction ring facing away from the brake chamber;
   connection devices by which the brake disc friction portion is connected with the brake disc chamber, the connection devices including head portions having underside surfaces in contact with a side of the collar portion facing the wall portion that is opposite a side of the collar portion in contact with the at least one brake chamber-side friction ring,
   wherein
      the wall portion of the jacket of the brake disc chamber has sections with a reduced wall thickness in the form of axially oriented recesses located on an outer circumference of the wall portion of the brake disc chamber, and/or openings in the wall portion in which there is no material of the wall portion present between a radially inner region inside the brake disc chamber and a radially outer region outside the brake disc chamber, the axially oriented recesses and/or openings extending axially outward beyond an outer axial height of the head portions,
      each of the reduced wall thickness sections accommodates at least a portion of a respective head portions located between circumferentially opposite sides of each reduced wall thickness section,
      the sections of the reduced wall thickness and/or the openings are configured to receive the connection devices by which the brake disc friction portion is connected with the brake disc chamber at the collar portion,
      when in an installed position, radially inner edges of the head portions are radially closer to a rotation axis of the brake disc chamber than radially outer edges of the corresponding axially oriented material recesses that are laterally adjacent to the heads of the connection devices,
      the collar portion of the jacket does not extend axially away from the brake disc chamber beyond the at least one brake chamber-side friction ring that is in contact with the collar portion, and
      no portion of the brake disc chamber is present in a region on a side of the at least one brake chamber-side friction ring facing away from the brake disc chamber and axially aligned with a region of contact between the collar portion and the at least one chamber-side friction ring.

2. The brake disc according to claim 1, wherein the brake disc chamber is made of a light metal, a steel or a non-metal material.

3. The brake disc according to claim 1, wherein the at least one friction ring and the brake disc chamber are mutually centered via the connection devices.

4. The brake disc according to claim 1, wherein at least one centering shoulder is provided on the jacket of the brake disc chamber, and further wherein the at least one friction ring and brake disc chamber are mutually centered by way of the at least one centering shoulder.

5. The brake disc according to claim 1, wherein
the at least one friction ring has at least one fastening projection extending from the friction surface radially inward, and
the collar is connected with the at least one fastening projection via the axially oriented connection devices.

6. The brake disc according to claim 1, wherein a joint between the at least one friction ring and the brake disc chamber is configured as a press fit, a shrunk-on fit, a material bonding, or a form-fitting, connection.

7. The brake disc according to claim 1, wherein the connection devices comprise rivets.

8. The brake disc according to claim 7, wherein the brake disc chamber and the at least one friction ring are connected via a wobble riveting process.

9. The brake disc according to claim 7, wherein the rivets are one or more of knurled rivets, upset rivets or stepped rivets provided to generate a connection free of play.

10. The brake disc according to claim 7, further comprising a ring-shaped steel band arranged between rivet closing heads and a linking surface of the at least one friction ring.

11. The brake disc according to claim 10, wherein the at least one friction ring has elevations between the rivet closing heads in the axial direction in order to brace the ring-shaped steel band via level differences.

12. The brake disc according to claim 10, wherein the ring-shaped steel band is a wavy steel ring.

13. The brake disc according to claim 7, wherein spring steel washers are provided at the rivets.

* * * * *